May 13, 1947.  R. G. STEWART, SR  2,420,573
METAL ROLLING MILL UNIVERSAL SPINDLE COUPLING
Filed Oct. 22, 1943  2 Sheets-Sheet 1

INVENTOR:
ROBERT G. STEWART, SR.,
BY: John E. Jackson
HIS ATTORNEY.

INVENTOR:
ROBERT G. STEWART, SR.,
BY: John E. Jackson
HIS ATTORNEY.

Patented May 13, 1947

2,420,573

UNITED STATES PATENT OFFICE 2,420,573

METAL ROLLING MILL UNIVERSAL SPINDLE COUPLING

Robert G. Stewart, Sr., Pittsburgh, Pa., assignor to Carnegie-Illinois Steel Corporation, a corporation of New Jersey Application October 22, 1943, Serial No. 507,336

4 Claims. (Cl. 64—7)

This invention relates to metal rolling mill, universal spindle couplings.

A specific example of the invention is illustrated by the accompanying drawings, in which:

Figures 3 and 4 are enlargements of details.

Figure 1:
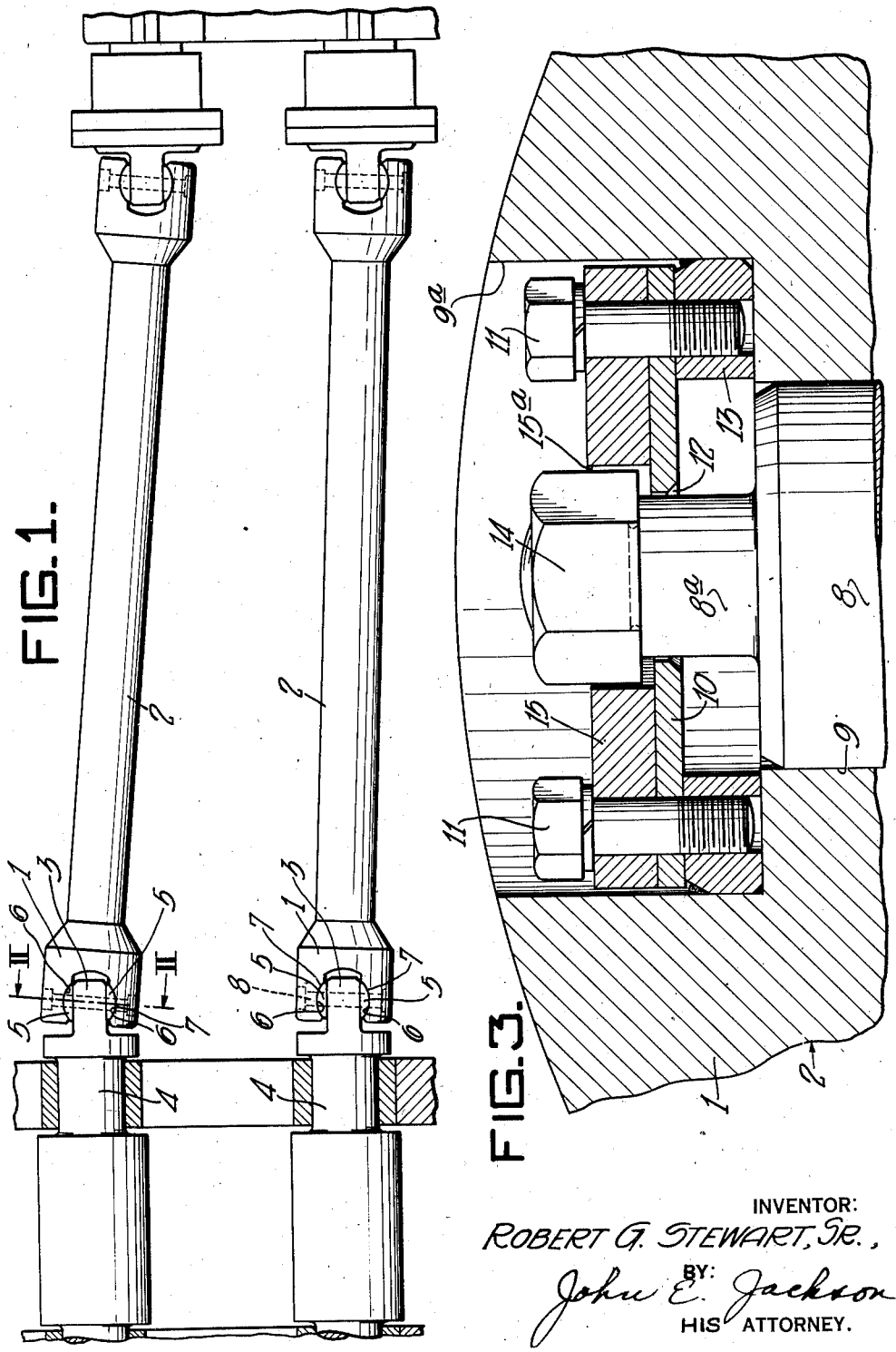
Figure 1 shows an example of couplings, embodying the invention, in use.
Figure 2:
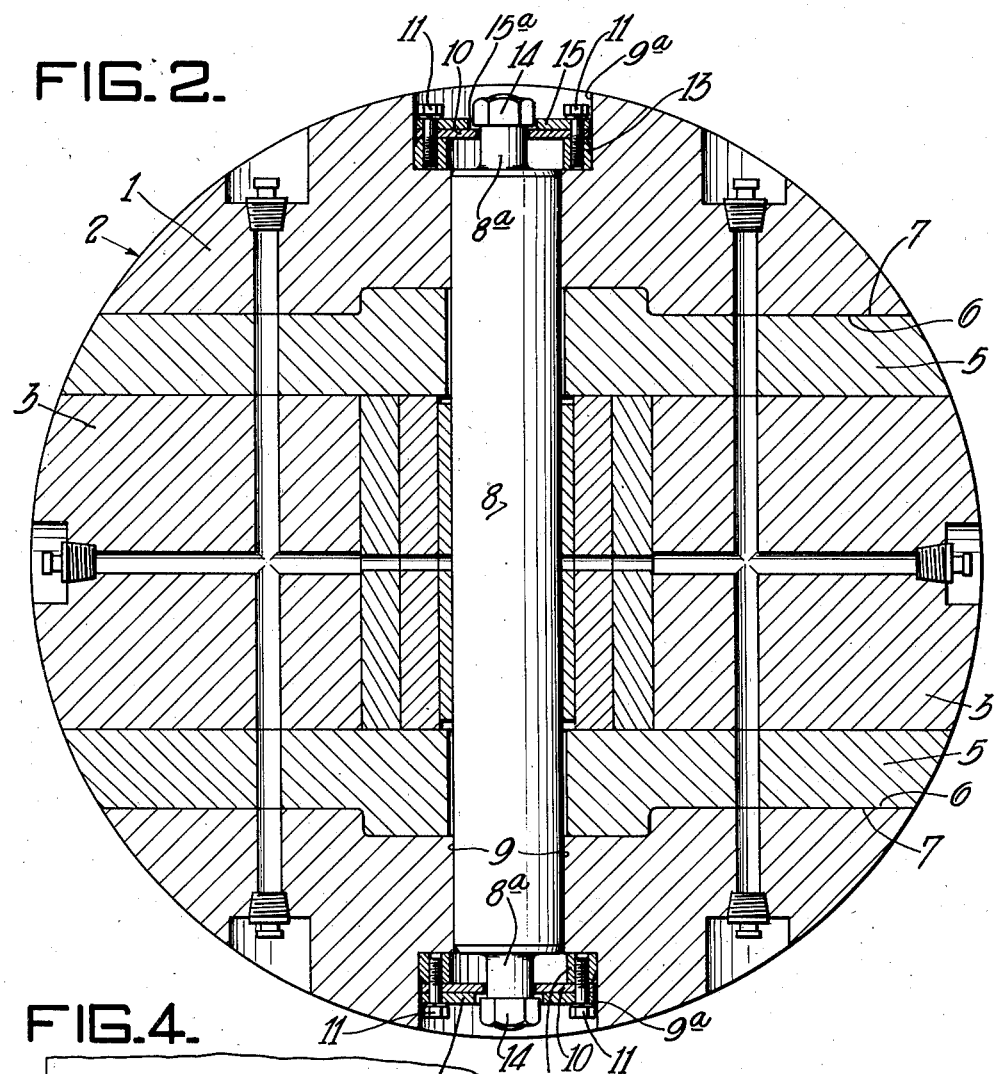
Figure 2 is a cross section on the line II—II in Figure 1.
Figure 4:
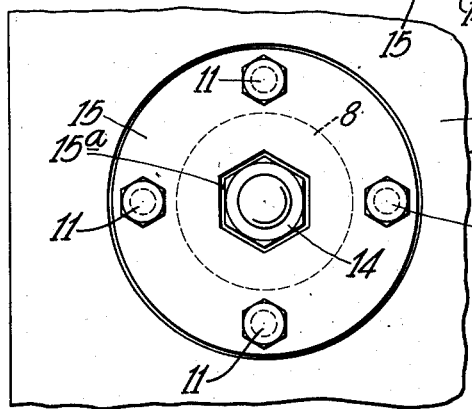

More specifically, these drawings show a metal rolling mill, universal spindle coupling of the type including a socket part 1, on the end of the spindle 2, receiving a tongue 3, on the end of the roll neck 4, swinging between slippers 5 having curved surfaces 6 working between curved surfaces 7 of the socket part 1, and with a bearing pin 8 fitted in a passage 9 extending transversely through the socket part 1, slippers 5 and tongue 3 so as to closely engage the pin transversely while permitting play longitudinally of the coupling.

Prior to the present invention, the pin 8 was positioned, against longitudinal displacement, by nuts screwed on its ends within countersinks 9a, for the hole 9. However, the pin 8 is subject to breakage when the coupling is in service, yet the nuts which held the pin in place performed their function only while the pin was unbroken. As a result of this arrangement, accidents occurred, parts of the pin, when the pin broke, riding outwardly so as to extend beyond the outer periphery of the socket part 1 and caused damage to adjacent mill equipment, or in some instances the parts were thrown completely from the coupling so as to become hazardous projectiles. In the case of the present invention this situation is corrected.

Continuing, the pin 8 is provided with smaller diameter, concentric, axially extending necks 8a, the total length of the pin and the necks being less than the width of the socket part 1 between the openings of the passage 9. Disks, or keeper plates, 10 are fixed in the countersinks 9a, by cap screws 11, and have holes 12 through which the necks 8a extend but which are smaller than the pin 8 itself, these disks 10 being positioned by spacers 13 welded in the bottoms of the countersinks 9a, so that upon pin breakage the parts of the pin 8 move far enough toward the passage openings to cause the necks 8a to function as pin-breakage tell-tales without projecting beyond the passage openings to become hazards, the cap screws being screwed into the welded spacers 13 so that security is provided. Fastenings, on the ends of the necks 8a, in the form of nuts 14 screwed onto these ends, engage the outsides of the disks 10 and thereby position the pin 8, while it is unbroken, centrally of the socket part 1 in its proper relation respecting the socket part 1, slippers 5 and tongue 3. The screwed relation of the nuts 14 with the necks 8a is such as to space the opposite inside surfaces of the nuts 14 a distance slightly greater than that between the outsides of the disks 10, so the pin floats longitudinally to a slight degree, as is mechanically desirable, and other disks, or locking plates 15, having apertures 15a fitting the outsides of the nuts 14, are fixed to the outsides of the disks 10, by the same cap screws 11, to lock the nuts 14 against rotation without locking them against longitudinal motion when the pin 8 floats, or greater motion when it breaks.

When in use, the pin 8 floats the slight distance permitted by the spacing of the nut insides relative the outsides of the inner disks, and the pin is restricted to this motion unless it breaks, in which event the pin parts can float outwardly until the ends of the pin parts abut the insides of the inner disks, the parts then being positively retained against further outward movement. At this time the ends of the pin necks have become flush, or almost so, with the outside of the coupling socket part, so that the mill operator can see that the pin has broken.

I claim:

1. A metal rolling mill, universal spindle coupling of the type including a socket part receiving a tongue swinging between slippers having curved surfaces working between curved surfaces of the socket part, with a bearing pin fitted in a passage extending transversely through the socket part, slippers and tongue so as to closely engage the pin transversely while permitting play longitudinally of the coupling; the coupling being characterized by having the pin provided with smaller diameter, concentric, axially extending necks and by the length of the pin and the necks being less than the width of the socket part between the pin passage openings, and by having disks fixed inside the passage end portions with holes through which the pin necks extend, but which are smaller than the pin, the disks being positioned so that upon pin breakage the pin parts move far enough toward the passage openings to cause the necks to function as pin-breakage tell-tales without projecting beyond the passage openings to become hazards, and the necks having fastenings on their ends beyond the disks for engaging the latter and thereby positioning the pin, while it is unbroken, centrally of the socket part in its proper relation respecting the socket part, slippers and tongue.

2. A metal rolling mill, universal spindle coupling of the type including a socket part receiving a tongue swinging between slippers having curved surfaces working between curved surfaces of the socket part, with a bearing pin fitted in a passage extending transversely through the socket part, slippers and tongue so as to closely engage the pin transversely while permitting play longitudinally of the coupling; the coupling being characterized by having the pin provided with smaller diameter, concentric, axially extending necks and by the length of the pin and the necks being less than the width of the socket part between the pin passage openings, and by having disks fixed inside the passage end portions with holes through which the pin necks extend, but which are smaller than the pin, the disks being positioned so that upon pin breakage the pin parts move far enough toward the passage openings to cause the necks to function as pin-breakage tell-tales without projecting beyond the passage openings to become hazards, and the necks having fastenings on their ends beyond the disks for engaging the latter and thereby positioning the pin, while it is unbroken, centrally of the socket part in its proper relation respecting the socket part, slippers and tongue, said fastenings comprising nuts screwed on the neck ends distances spacing the opposite inside surfaces of the nuts a distance slightly greater than that between the outsides of the disks, so the pin floats longitudinally to a slight degree, and disks having apertures fitting the outsides of the nuts being fixed at the outsides of the first named disks to lock the nuts against rotation without locking them against longitudinal motion when the pin floats or breaks.

3. A rotatable part having a through hole transverse to its rotative axis, a pin having a central portion and a neck of reduced diameter extending beyond each end of the central portion, the total length of the central and neck portions of the pin being less than that of the hole, the pin being slidably fitted in the hole and being subject to breakage, a stop member fixed inside each end of the hole in the rotative part, each said stop member projecting toward the respective neck of the pin for a distance such that it allows the neck to slide freely thereby but prevents passage by it of the central portion of the pin, the surfaces of the stop members inwardly of the hole through the rotative part being spaced apart a distance longitudinally of the hole greater than the length of the central portion of the pin, and fastening means on the end of each of the necks of the pin outside its respective stop member for engaging the latter and thereby positioning the pin while the pin is unbroken.

4. A rotative part having a through hole transverse to its rotative axis, a pin having a central portion and a neck of reduced diameter extending beyond each end of the central portion, the total length of the central and neck portions of the pin being less than that of the hole, the pin being slidably fitted into the hole and being subjected to breakage, a disk fitted inside each end of the hole in the rotative part, each said disk having a hole through which the respective pin neck extends, such hole being smaller in diameter than the central portion of the pin, the surfaces of the respective disks inwardly of the hole through the rotative part being spaced apart longitudinally of the hole through the rotative part a distance greater than the length of the central portion of the pin, and fastening means on the end of each of the necks of the pin outside its respective disk but within the hole through the rotative part for engaging its respective disk and thereby positioning the pin while the pin is unbroken.

ROBERT G. STEWART, Sr.

REFERENCES CITED

The following references are of record in the file of this patent:

UNITED STATES PATENTS

| Number | Name | Date |
|---|---|---|
| 1,978,209 | Kuhns | Oct. 23, 1934 |
| 1,115,433 | Hunt | Oct. 27, 1914 |
| 1,139,125 | Hennedy | May 11, 1915 |
| 1,566,454 | Waits | Dec. 22, 1925 |
| 1,300,733 | Keller | Apr. 15, 1919 |
| 1,985,405 | Ditges | Dec. 25, 1934 |